March 7, 1933.   A. LYSHOLM ET AL   1,900,119

VARIABLE SPEED POWER TRANSMISSION

Filed Jan. 8, 1932   6 Sheets-Sheet 1

INVENTORS
BY
ATTORNEY

March 7, 1933. A. LYSHOLM ET AL 1,900,119
VARIABLE SPEED POWER TRANSMISSION
Filed Jan. 8, 1932   6 Sheets-Sheet 3

March 7, 1933. A. LYSHOLM ET AL 1,900,119
VARIABLE SPEED POWER TRANSMISSION
Filed Jan. 8, 1932 6 Sheets-Sheet 4

Patented Mar. 7, 1933                                                                                          1,900,119

UNITED STATES PATENT OFFICE

ALF LYSHOLM, FRED HORNEY, AND GÖSTA WAHLSTEN, OF STOCKHOLM, SWEDEN, ASSIGNORS TO AKTIEBOLAGET LJUNGSTROMS ANGTURBIN, OF STOCKHOLM, SWEDEN, A JOINT-STOCK COMPANY OF SWEDEN

VARIABLE SPEED POWER TRANSMISSION

Application filed January 8, 1932, Serial No. 585,440, and in Germany January 14, 1931.

The present invention relates to variable speed power transmissions for self-propelled vehicles and has particular reference to transmissions of the type in which variable speed ratios between the prime mover and the driven shaft of the vehicle which is connected to the vehicle wheels is obtained by hydraulic variable speed mechanism. Still more particularly, the invention relates to variable speed power transmissions in which the hydraulic variable speed mechanism comprises a primary or driving member forming a pump impeller adapted to deliver energy transmitting fluid to a secondary or driven member forming a turbine rotor.

In power transmissions of the above character the action of the blading in the pump impeller and in the turbine rotor is similar to the action of blading in known forms of hydraulic or elastic fluid turbines, more specifically as invented and made known by Alf Lysholm, and the principles of design for the latter may be employed in designing the hydraulic variable speed mechanism.

From previous experience it is known that the efficiency of a turbine has an optimum value at a given speed of revolution of the turbine shaft and that the efficiency, as a general rule, is lowered upon an increase or decrease from the given speed at which the optimum efficiency value is obtained. In general, it may be said that the efficiency characteristic of a hydraulic variable speed transmission of the character under consideration is similar to the efficiency characteristic of turbines and from this it will be evident that there is a relatively limited range of speeds within which such a hydraulic transmission will operate at or near its highest efficiency. By making use of known principles of design, the hydraulic transmission mechanism may be made so that it operates at or near its best efficiency at a relatively low or at a relatively high speed of the vehicle which it is propelling. This difference in design will be dictated by the use for which the particular vehicle is intended and in vehicles for which the speed variation in normal use is not great, the hydraulic transmission mechanism alone may be satisfactory since a transmission of this type would, in such a vehicle, operate a large part of the time at comparatively high efficiency.

For vehicles which are operated at relatively widely varying speeds, hydraulic variable speed mechanism alone cannot provide highly efficient power transmission throughout the normal speed range of the vehicle and due to the comparatively low efficiency at which such mechanism would have to operate under certain operating conditions, the many advantages to be derived from the use of hydraulic variable speed mechanism would be offset to a greater or less degree by the relatively low average efficiency of the transmission over the entire speed range of the vehicle.

Among the objects of the present invention are; to provide a variable speed power transmission employing hydraulic variable speed mechanism in which the efficiency of power transmission throughout the speed range of a vehicle adapted to be driven at widely varying speeds may be maintained at a relatively high value; to provide a transmission of the character referred to in which hydraulic variable speed power transmitting mechanism is combined with means providing a direct drive from the driving to the driven shafts of the transmission so that either direct drive or geared drive may be selectively employed in accordance with momentary operating conditions; to provide a transmission having hydraulic variable speed power transmitting mechanism and direct drive means in which such mechanism and means are combined in a single compact unit suitable for installation in automobiles and the like; to provide a transmission of the above character in which the hydraulic variable speed mechanism is automatically and completely disengaged when the direct drive means is employed; to provide a transmission of the above character having an improved control mechanism and to provide further improvements in a transmission of the above character as will hereinafter more fully appear. For a better understanding of the more detailed objects of the invention and the advantages to be derived from its use, reference may best be had to the ensuing description of the several forms of transmission embodying the invention which are illustrated in the accompanying drawings forming a part of this specification.

Figure 1:
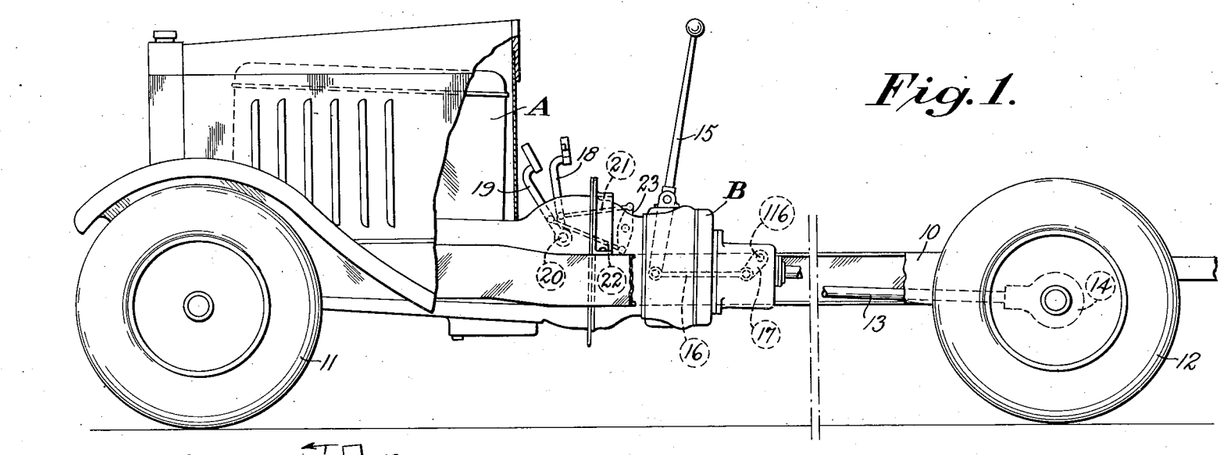
Fig. 1 is a more or less diagrammatic side elevation of the chassis of a vehicle having a transmission according to the present invention.

Referring now more particularly to Figure 1, a transmission embodying the invention is illustrated more or less diagrammatically as installed in an automobile or like form of self-propelled vehicle. The vehicle comprises a frame indicated generally at 10, sprung in any suitable known manner upon front and rear axles having wheels 11 and 12, respectively. Power is developed by the engine A and is delivered to the rear wheels of the vehicle through transmission B, propeller shaft 13 and the usual rear axle gearing indicated at 14. Control of the direction of drive through the transmission, in the form illustrated in Fig. 1, is accomplished through the medium of the shift lever 15 connected by means of any suitable linkage such as rod 16 and lever 17 to a rotatably mounted control member of the transmission to be hereinafter more fully described. Selective control of the hydraulic variable speed mechanism and of the direct drive means is effected through the medium of a foot control comprising pedals 18 and 19 pivoted at 20 and connected, respectively, by the links 21 and 22 to the arms of an operating lever 23 adapted to turn a second rotatably mounted control member of the transmission.

Turning now to Figs. 2 to 8 inclusive, the transmission B comprises a casing mounted so as to be stationary in the frame of the vehicle and comprising, in the form shown, a number of separate casing members 24, 25, 26 and 27. The casing members 24 may advantageously be connected to the engine housing 28 and the parts supported by means of suitable frame cross members 29.

Figures 2, 4, 8:
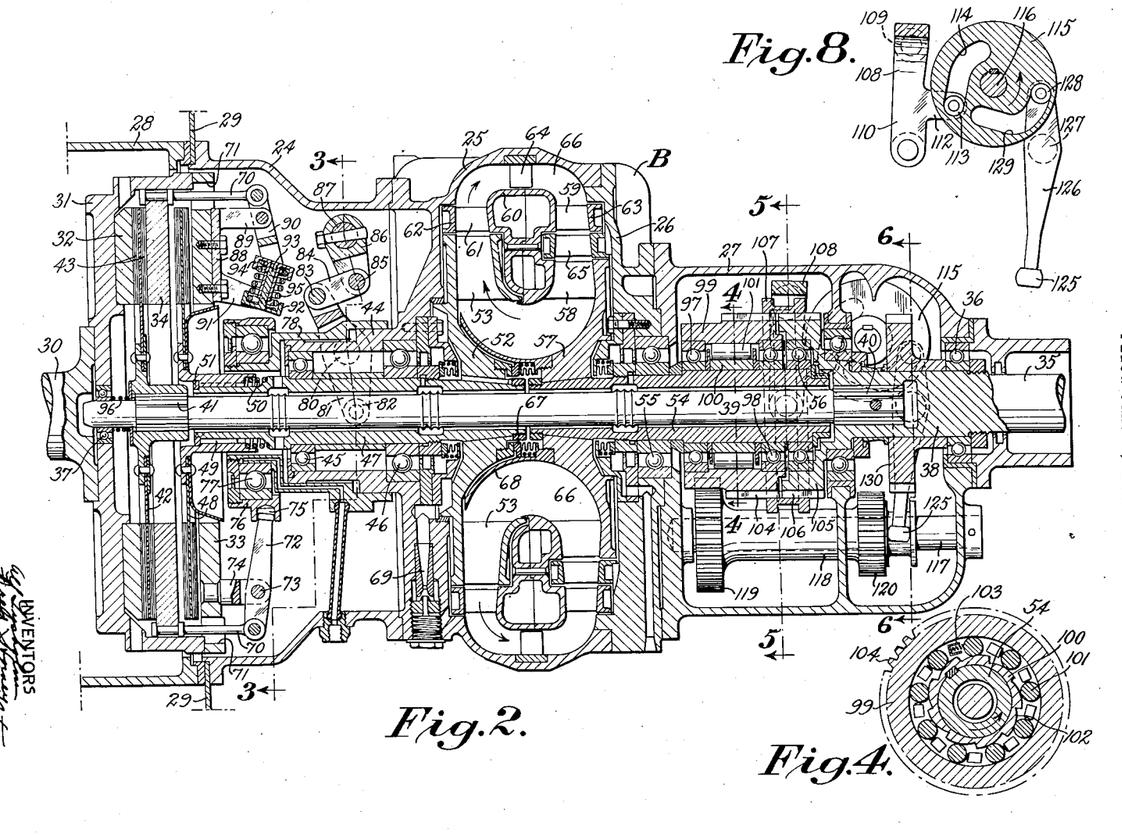
Fig. 2 is a longitudinal central section of a transmission embodying the invention.
Figs. 3 to 6 inclusive are sections taken on the respectively numbered section lines of Fig. 2.
Fig. 8 is an elevation of part of the mechanism shown in Fig. 2.

The driving shaft, which may be the crank shaft of the engine, is indicated at 30 and has rigidly secured thereto a hollow fly-wheel member 31 comprising axially spaced annular friction driving plates 32 and 33. A third annular driving plate 34 is mounted within the member 31 so as to have axial movement therein but not rotational movement with respect thereto.

The driven shaft of the transmission, indicated generally at 35, is rotatably mounted at the rear end of the transmission by means of the bearing 36 and extends through the transmission, in axial alignment with the driving shaft 30, to the supporting bearing 37 carried by the member 31. The driven shaft, in the embodiment shown, comprises a shaft part 38 which may be the propeller shaft of the vehicle and a shaft part 39 one end of which is splined as at 40 and seated in a suitable socket in the part 38. The forward end of part 39 is also splined as at 41 and this splined part has mounted thereon the clutch plate 42 provided with suitable friction facings 43.

The casing member 25 is provided with a web extending radially inwardly to support a cylindrical extension 44 in which are mounted bearings 45 and 46. These bearings rotatably support a tubular part 47 surrounding a portion of the shaft part 39. At its forward end the part 47 carries the clutch plate 48, the hub of which is mounted so as to have longitudinal but not rotational movement relative to the part 47. These parts may be splined as indicated at 49 and the clutch plate hub is urged forwardly by a coil spring 50 situated between suitable shoulders on the hub and the part 47. A stop ring 51 on part 47 limits the extent of forward movement of the clutch hub.

At its rearward end, the part 47 has keyed thereto an annular pump impeller 52 carrying a plurality of peripherally spaced axially extending pump blades 53. The parts 47, 52 and 53 may be said to constitute the primary or driving member of the hydraulic variable speed mechanism.

The driven or secondary member of the hydraulic variable speed mechanism comprises a tubular part 54 in axial alignment with the part 47 and rotatably supported about the shaft part 39 by bearings 55 and 56. The forward end of part 54 has rigidly secured thereto the turbine disc or rotor 57 which carries a row of peripherally spaced axially extending blades 58 and a second row of similar blades 59 radially spaced from the first mentioned series. Supported by the forward ends of these two rows of turbine blades is the hollow toroidal member 60 which serves to support at one end a third row of turbine blades 61 situated radially outside the pump blades 53. The forward ends of blades 61 are supported by the annular ring 62 and the ends of the blades 59 opposite the ends attached to the member 60 are supported by the annular ring 63.

A stationary ring of peripherally spaced guide vanes 64 is mounted in the casing member 25 and a second ring of peripherally spaced guide vanes 65 is situated between the rows of turbine blades 58 and 59.

As will be observed from the figure, the several parts comprising the primary and secondary members of the hydraulic mechanism, and the casing parts enclosing the same, provide a space 66 adapted to be filled with power transmitting fluid, which space is annular in longitudinal cross-section and also annular in transverse cross-section. Leakage of fluid from this space between members 52 and 57 is prevented by a suitable expansible packing means 67 attached to one of the members and bearing against a suitable surface on the other of the members. In order to reduce the tendency for fluid to leak from space 66, member 57 is advantageously provided with a flange 68 extending forwardly to overlap the hub portion of the member 52.

The specific details of the form of hydraulic variable speed mechanism herein illustrated do not form per se a part of the present invention. A suitable form of hydraulic variable speed mechanism is disclosed in the copending application of Alf Lysholm, Serial No. 234,175 and in order to secure a suitably flat efficiency curve we prefer to employ blading of the character disclosed in the United States Reissue Patent 18,485 granted May 31, 1932, on the application of Alf Lysholm.

The blading in the hydraulic mechanism is disposed so that upon rotation of member 52, the fluid in the space 66 is thrown radially outwardly by the pump blades 53 in the direction indicated by the arrows in Fig. 2 and impinges upon the turbine blades 61 directly after leaving the outlet edges of the pump blades 53. The fluid discharged from blades 61 then passes through the stationary guide vanes 64 to the row of turbine blades 59, from which row it passes through the second ring of stationary guide vanes 65 to the third and last row of turbine blades 58. From blades 58 the fluid is returned to the inlet side of the ring of blades 53 for recirculation through the closed system.

In order to prevent cavitation and to keep the space in the hydraulic mechanism filled with fluid, an ejector arrangement indicated generally at 69 is advantageously provided. An arrangement such as that shown at 69 forms the subject matter of the copending application of Alf Lysholm, Serial No. 555,767 to which reference may be had for further details of construction and also for a disclosure of means providing for the cooling of the operating fluid.

Figure 3:
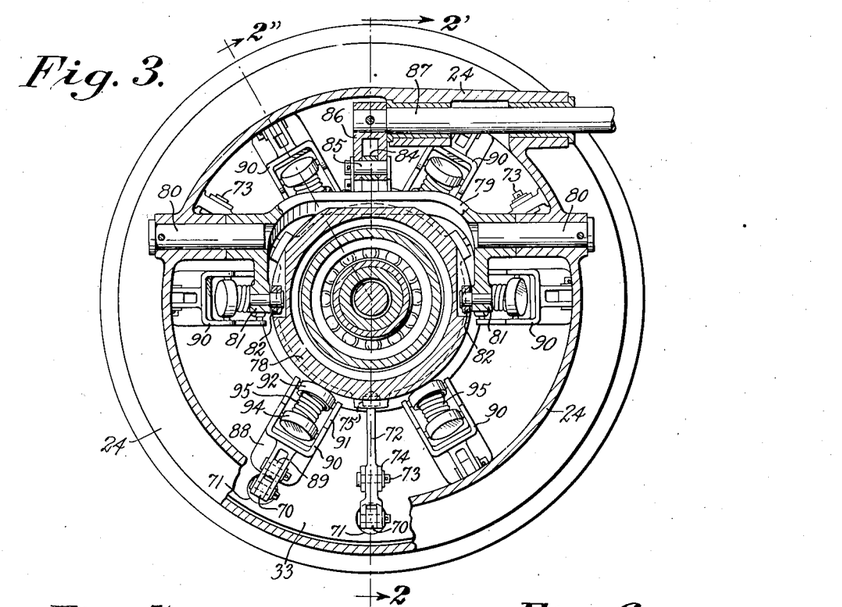
Figure 5:
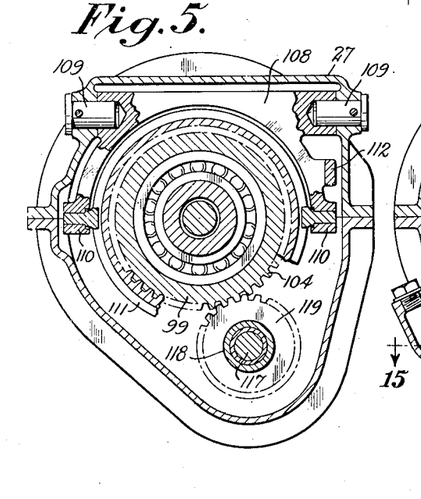
Figure 6:
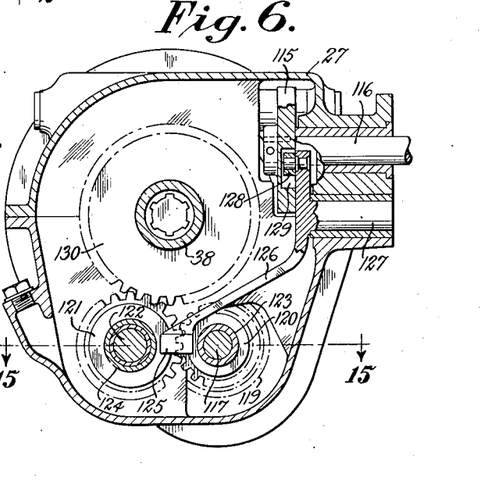
Figure 7:
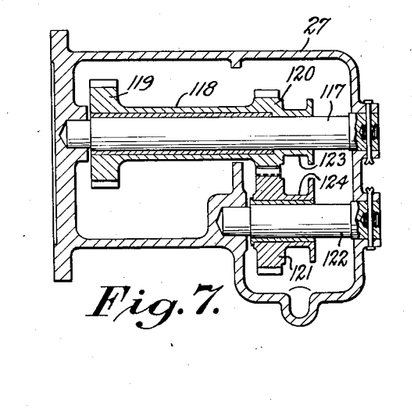
Fig. 7 is a section taken on the line 7—7 of Fig. 6.

Returning to the clutch mechanism and with particular reference to Figs. 2 and 3, the axially movable driving clutch plate 34 has attached thereto a series of peripherally spaced rods 70 extending axially through suitable apertures 71 in the plate 33. Some of the rods 70 are pivotally connected to the outer ends of radially extending levers 72 which are in turn pivoted at 73 to arms 74 fixed to member 33.

The inner ends of levers 72 project into suitable recesses 75 in a ring 76 rotatably mounted by means of the ball bearing 77 on a sleeve 78 slidably engaging the extension 44 of the casing member 25. A yoke 79 is pivotally mounted in the casing member 24 on pins 80, the depending arms 81 of the yoke being pivotally connected at 82 to the sleeve 78. At 83 the yoke is pivoted to a link 84 which in turn is pivoted at 85 to the end of a lever 86 fixed on shaft 87. Shaft 87 is journaled in the casing member 24 and projects therethrough.

The clutch member 33 has secured thereto a plurality of peripherally spaced brackets 88 situated between the spaced levers 72. Each of the brackets 88 comprises an arm 89 to which is pivoted a lever 90 having its outer end pivotally connected to one of the rods 70. A second arm 91 on each of the brackets provides a pivot support for a cup-shaped member 92 having a stem 93 upon which is slidably mounted a second cup-shaped member 94. Member 94 is pivoted to the inner end of the lever 90 and a coil spring 95 is situated between members 93 and 94. As will be evident from Figs. 2 and 3, the above described parts carried by the brackets 88 constitute spring actuated toggle mechanism acting on the axially movable clutch plate 34.

A spring 96 between the bearing 37 and the hub of the driven clutch plate 42 tends to move this clutch plate out of contact with the driving plate 32.

The driven member 54 of the hydraulic mechanism has mounted thereon spaced ball bearings 97 and 98 which carry the outer ring 99 of an overrunning clutch (see Fig. 4). This clutch comprises, in addition to the outer ring 99, an inner ring 100 keyed or otherwise fixedly secured to the part 54 and a plurality of roller detents 101 between these rings. The inner ring 100 has a plurality of cam surfaces 102 which, together with the inner surfaces of ring 99 provide a series of pockets into which the roller detents 101 are pressed by means of suitably mounted springs 103. As will be evident from Fig. 4, this overrunning clutch will operate to transmit power in counter-clockwise direction (as viewed in this figure) through the gripping detents from member 54 to the ring 99 and will permit ring 99 to rotate in counter-clockwise direction with respect to ring 100 without transmitting power from ring 99 to the member 54.

The outer surface of ring 99 is provided with axially extending gear teeth 104 and an annular extension 105 at the forward end of the shaft part 38 is provided with similar teeth 106. A sliding collar 107 having internal teeth adapted to mesh with teeth 104 and 106 serves to transmit power from ring 99 to the extension 105 of the driven shaft when the collar is in the position shown in Fig. 2.

Collar 107 may be moved out of engagement with the teeth on ring 99 by means of a yoke 108 (Figs. 5 and 8) pivoted at 109 in the casing member 27 and having depending arms 110 engaging at opposite sides an external groove 111 in the collar 107. One of the arms of yoke 108 is provided with an axially extending ear 112 carrying a roller 113 which is situated in a cam slot 114 in plate 115 (see Fig. 8). Plate 115 is fixed to the inner end of an operating shaft 116 rotatably mounted in the casing member 27 and extending through the casing.

In the lower part of the casing member 27, there is mounted a counter shaft 117 which carries a sliding gear member 118. Member 118 comprises a gear 119 adapted to mesh with the gear formed by teeth 104, and a second gear 120 adapted to mesh with an idler gear 121 (see Fig. 7) slidably mounted on a second counter shaft 122. Member 118 and gear 121 are grooved at 123 and 124, respectively, and these grooves are engaged by the end 125 (see Figs. 6 and 8) of a lever 126 pivoted in the casing at 127. At its upper end lever 126 carries a roller 128 situated in a second cam slot 129 in the plate 115.

In Fig. 2, the parts are illustrated in the position affording direct drive. In this position the sleeve 78 has been moved to its extreme rearward position due to actuation of the control shaft 87, thus moving the clutch plate 34 forwardly so that the driven clutch plate 42 is gripped between the driving clutch plates 32 and 34. Clutch plate 34 is held in the position indicated in the drawings and the axial pressure necessary to maintain clutch engagement is exerted due to the action of springs 95 in the toggle mechanism carried by the plate 33. In this position of the parts, clutch plate 48 is disengaged and any tendency for this plate to be dragged due to contact with plate 33 is prevented by the action of spring 50 which operates to move the plate 48 out of contact with plate 33.

With the parts in the position shown, power is transmitted directly from the driving shaft 30 through the clutch plate 42 to the shaft part 39 and through the splined connection 40 to the shaft part 38. The transmission is designed for what may be termed normal or usual direction of rotation of the driving shaft, that is, clockwise direction as viewed from the left of Fig. 2. Such being the case, the rotation of the shaft part 38 in this direction will cause the outer ring 99 of the overrunning clutch to rotate in the same direction, provided that the collar 107 is in the position shown in which it engages both teeth 104 and teeth 106. As viewed in Fig. 4, the assumed direction of rotation of ring 99 will be counter-clockwise and it will be evident that this ring can rotate without transmitting drive to the secondary member 54 of the hydraulic mechanism. The overrunning clutch mechanism, therefore, provides means for automatically disconnecting the driven portion of the hydraulic mechanism under direct drive operating conditions and consequently there will be no loss in the transmission due to useless rotation of the rotating members of the hydraulic mechanism.

If, now, indirect or asynchronous drive between the driving shaft and the driven shaft is desired, shaft 87 is turned in counter-clockwise direction as viewed in Fig. 2 so as to shift the sleeve 78 forwardly and through the medium of levers 72 and rods 70 to pull the movable clutch plate 34 rearwardly so that the driven clutch plate 48 is gripped between plates 33 and 34. The initial movement of shaft 87 to effect this shift of the clutch is resisted by the springs 95 until the toggle mechanism passes its dead center position, after which springs 95 assist in the shifting movement and after the shifting movement is completed, maintain the desired engaging pressure on the plate 34. It will be evident that the clutch arrangement provides for selectively driving clutch plates 42 and 48 in alternation and that upon engagement of one of these plates the other is automatically released. When the plate 34 is shifted so as to engage plate 48, the driven plate 42 is moved from contact with plate 32 by the action of spring 96 so as to provide positive disengagement of the direct drive clutch.

With the clutch parts shifted so that the clutch plate 48 is engaged, drive is transmitted from the shaft 30 to the primary member 47 of the hydraulic transmission mechanism and fluid is circulated by the impeller blades 53 in the direction indicated by the arrows in Fig. 2. The energy of the circulating fluid is absorbed by the turbine blades 61, 59 and 58 in the order named and the secondary member of the hydraulic mechanism is rotated due to this energy in the same direction as the primary member but at a reduced speed. The difference in speed between these two members varies automatically in accordance with variations in the speed at which the primary member is rotated by the driving shaft and the variations in the load on the driven member.

Rotation of the secondary member 54 (with the assumed direction of rotation of shaft 30) is counter-clockwise as viewed in Fig. 4 and from this figure it will be evident that the overrunning clutch will operate to transmit drive from member 54 to the ring 99. From ring 99 the line of power transmission is through collar 107 and the extension 105 to the shaft part 38.

In order to secure reversal of direction of rotation of the driven shaft 35, the path of power transmission from the hydraulic mechanism to the driven shaft is interrupted by shifting the collar 107 to the right from the position shown in Fig. 2 so that the collar is in engagement only with the teeth 106. After the path of power transmission for forward drive has been broken, reversal of rotation of shaft 35 is provided for by shifting the reversing gear member 118 and the idler gear 121 rearwardly of the transmission so that gear 119 meshes with teeth 104 and gear 121 meshes with the reverse gear 130 fixed to the shaft part 38.

The manner in which the steps of disconnecting the collar 107 and meshing the reversing gears are effected will be evident from Figs. 2 and 8. Shaft 116 and plate 115 are rotated in counter-clockwise direction from the forward drive position, in which position the parts are shown in these figures. Initial movement of plate 115 in this direction will not cause movement of lever 126, which lever controls the position of the reversing gears, due to the fact that the first portion of the cam slot 129 in which the roller 128 moves is struck on a radius about the center of rotation of shaft 116. On the other hand, the portion of the cam slot 114 in which the roller 113 first moves has a radial component causing the roller to move toward the center of rotation of the plate and consequently causing the yoke 108 to turn in counter-clockwise direction about its pivots 109. This movement acts to shift the collar 107 to the right so as to uncouple the ring 99 from the shaft extension 105.

Upon continued movement of the plate 115, the roller 113 moves into a portion of the slot 114 which has no radial component so that no further movement of collar 107 takes place. On the other hand, the continued movement of plate 115 causes the roller 128 to move into a portion of the cam slot 129 which has a radial component causing the roller to move toward the center of rotation of the plate or in other words, to the left in Figs. 2 and 8. This movement shifts member 118 and gear 124 to the right so that the desired reverse connection between the hydraulic mechanism and the driven shaft is secured.

It will be evident without further description that with the mechanism in the position for reverse drive, movement of the plate 115 in clockwise direction (as viewed in Figs. 2 and 8) will re-establish forward drive connection between the secondary member of the hydraulic mechanism and the driven shaft by first moving the reversing gears out of engagement and then shifting the collar 107 to the position in which it couples the parts 99 and 105.

When the transmission is installed in a vehicle as shown in Fig. 1, connection for forward and reverse drive may be controlled conveniently through the medium of lever 15, link 16 and lever 17, the latter being connected to the shaft 116.

Control of the transmission with respect to direct drive and drive through the hydraulic variable speed mechanism, which latter drive will be referred to as hydraulic drive, may be effected advantageously through the dual pedal mechanism illustrated in Figs. 1 and 9 to 11. In this arrangement, the lever 23 is fixed to the shaft 87 for actuating the clutch shifting mechanism, opposite ends of this lever being connected to pedals 18 and 19 by links 131 and 132, respectively. As may be seen more clearly from Figs. 10 and 11, pedal 18 is slotted at 133 to permit the pedal to pass the laterally extending arm 134 on pedal 19 and pedal 19 is similarly slotted at 135 to permit the passage of a laterally extending arm 136 on pedal 18. As will be observed from Fig. 11, the upper surfaces of arms 134 and 136 are below the level of the upper surfaces of the pedals from which they extend.

Figure 9:
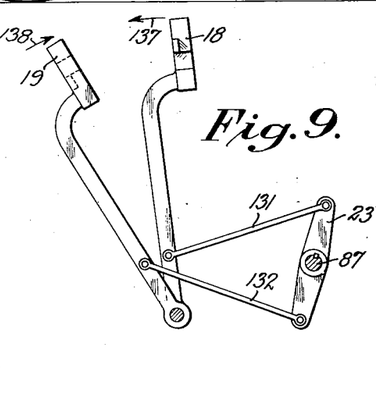
Fig. 9 is a view on an enlarged scale of the pedal mechanism shown in Fig. 1.

Assuming that the transmission is set for direct drive, as illustrated in Fig. 2, when the pedals are in the position shown in Fig. 9, shifting of the transmission to hydraulic drive is accomplished by depressing pedal 18 in the direction indicated by arrow 137. This movement will turn shaft 87 in counter-clockwise direction to disengage the driven clutch plate 42 in the manner already described and, through the medium of links 131 and 132 the lever 23 will cause upward movement of pedal 19 in the direction of the arrow 138. Until the mid or dead center position of the toggle mechanism comprising springs 95 is reached, the pedal 18 will resist the pressure of the operator's foot tending to move the pedal downwardly but as soon as the dead center position is passed, it will be evident that the toggle mechanism will tend to cause pedal 18 to continue its downward movement to the position occupied by pedal 19 in Fig. 9. If this motion were permitted without restraint, it will be evident that the operator could not exercise any control over the rate at which the engagement of clutch plate 48 would be effected. With the arrangement illustrated, however, the operator can control the speed of engagement of the clutch plate 48 since the upwardly moving pedal 19 provides means for controlling the speed of movement of the pedals as soon as this pedal passes the downwardly moving pedal 18.

The full range of movement of the clutch shifting mechanism is therefore under the control of the operator, whose foot is in contact with the downwardly moving pedal 18 from the position shown in Fig. 9 to the dead center position and whose foot is in contact with the upwardly moving pedal 19 from the dead center position of the pedals to the reversed position of the pedals representing the end of the shifting movement.

If the clutch mechanism is shifted so as to provide hydraulic drive, the positions of pedals 18 and 19 is reversed from that shown in the drawings and in order to shift back to direct drive, the operator depresses pedal 19, thereby causing pedal 18 to rise.

Figures 10, 11:
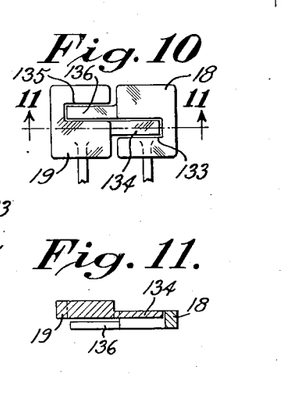
Fig. 10 is a view looking from the right of Fig. 9 and showing a part of the pedal structure with the pedals in a different position.
Fig. 11 is a section taken on the line 11—11 of Fig. 10.

In order that, regardless of whether pedal 18 or pedal 19 is the pedal to be depressed, the operator can depress the pedal to be depressed below a position corresponding to the absolute dead center position of the toggle mechanism, the extensions on the pedals are arranged in the manner shown in Fig. 11 from which figure it will be evident that if pedal 18 is the one which is to be depressed, it can be depressed beyond its mid or dead center position before the extension 134 on pedal 19 comes in contact with the operator's foot to prevent further manual depression of pedal 18. Once the dead center position has been passed, however, further manual depression is not necessary since the balance of the downward movement of pedal 18 is effected due to the toggle mechanism. Likewise, if pedal 19 is the one which is to be depressed, this pedal can be depressed manually beyond the dead center position before downward movement of the operator's foot is halted by contact with the extension 136 of the upwardly moving pedal 18.

It will be evident that the operator can at will hold both pedals in mid position, in which case both clutches will be disengaged. This provides a "neutral" or non-power-transmitting position permitting ready shifting of the mechanism controlling the direction of drive.

Turning now to Figs. 12 to 15, there is illustrated an improved consolidated control system for a transmission of the type disclosed, this system permitting control of both forward and reverse movement and of both direct and hydraulic drive through the medium of a single manually operable control lever, the movement of which is similar to the movement of the gear shift lever for conventional gear type transmissions. The specific arrangement shown in these figures is one which we have employed in a bus in which the operator's compartment is adjacent to and at one side of the engine A. In this arrangement the shaft 116 for operating the reversing mechanism has mounted at its outer end a bevel pinion 139 meshing with a gear 140, these gears being enclosed in a suitable housing 141. Gear 140 is connected by means of a splined connection 142 to a longitudinally extending shaft 143 mounted so as to have axial and turning movement. Shaft 143 can move axially with respect to gear 140 but not rotationally with respect thereto, due to the splined connection 142.

Figure 12:
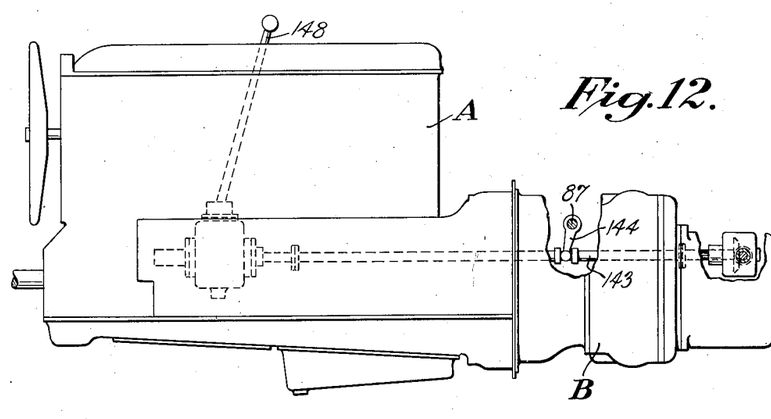
Fig. 12 is a side elevation of another form of control system for the transmission.

Intermediate its ends shaft 143 is pivotally connected to the lower end of a lever 144 fixed to the shaft 87 which operates the clutch shifting mechanism. A control lever housing 145 adapted to be secured to the side of the motor casing or to some fixed member of the vehicle provides a sliding bearing 146 for the forward end of shaft 143 and also provides a universal bearing 147 for mounting the control lever 148. The lower end of lever 148 has a ball and socket connection 149 with a block 150 pinned as at 151 to the shaft 143. The lower face of block 150 is provided with longitudinal guide slots 152 and 153 and a transverse slot 154 in which slots is adapted to slide a projecting pin 155 fixed in the housing 145.

From the figures it will be evident that through the medium of the control lever 148, shaft 143 may be moved longitudinally and also may be rocked when the lever lies in a vertical plane transverse to the axis of shaft 143 so that the pin 155 is in registry with the transverse slot 154.

Figure 13:
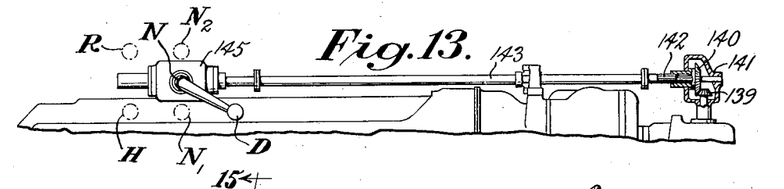
Fig. 13 is a plan view of part of the mechanism shown in Fig. 12.
Figure 14:
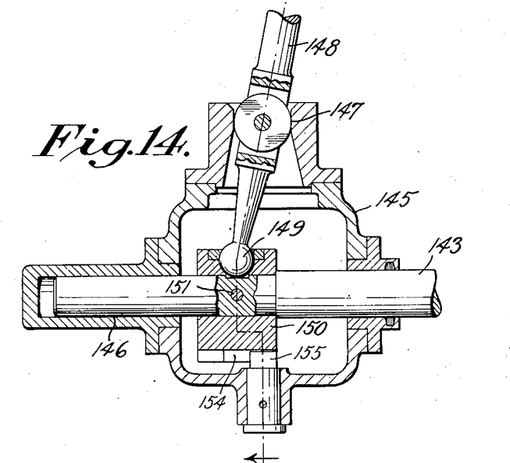
Fig. 14 is a section on an enlarged scale of a part of the mechanism shown in Fig. 13.
Figure 15:
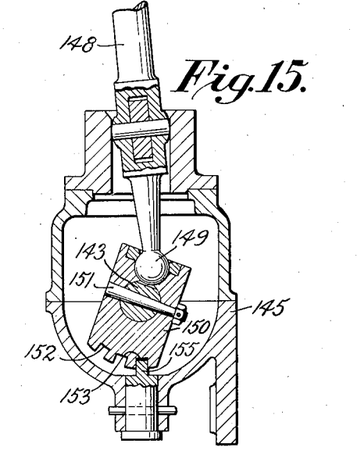
Fig. 15 is a section taken on the line 14—14 of Fig. 15.

Referring now more particularly to Figure 13, the lever is shown in the control position corresponding to direct forward drive. In this position the operating end of the lever is pulled rearwardly which pulls the shaft 143 forward, the lever 144 (Fig. 12) being connected to shaft 87 so that when this lever is in the position shown, lever 86 is in the position shown in Fig. 2 and the direct drive clutch is engaged. With the lever in the direct drive position shown in Fig. 13, the pin 155 is in slot 153 so that shaft 143 is rocked as indicated in Fig. 15. Gears 142 and 139 are meshed so that when shaft 143 is in the position shown in Fig. 15, the plate 115 is in the position shown in Figs. 2 and 8 and the reversing gears are out of mesh.

In order to shift from direct drive to hydraulic drive, the lever 148 is pushed forward so that the operating end of the lever is in the position shown by the dotted circle H in Fig. 13. This movement does not rock shaft 143, so that the position of the reversing gears is not altered, but the resulting longitudinal movement swings levers 144 and 86 (Figs. 12 and 2) in clockwise direction as viewed in these figures so that the direct drive clutch is disengaged and the hydraulic drive clutch is engaged.

Reverse is effected by moving the operating end of the lever to the dotted line position shown at R in Fig. 13. In order to effect this movement from either the forward direct drive or hydraulic drive positions the lever is first moved to the position indicated at N (Fig. 13) in which position both clutches are disengaged. From this position, it can be moved laterally to position $N_2$ to rock the shaft 143 so as to cause engagement of the reverse gears, and movement of the vehicle in reverse direction can then be effected by moving the lever forwardly from position $N_2$ to the reverse position R in which the hydraulic drive clutch is engaged.

With the lever in the neutral position N, a complete "neutral" is effected, both clutches being out of engagement, the reverse gears being disengaged, and the secondary member of the hydraulic mechanism being uncoupled from the driven shaft.

From the foregoing it will be seen that the consolidated control which we have provided enables complete operating control of the transmission to be obtained with a single operating lever adapted to be moved into positions similar to the various control positions to which the conventional type of gear operating lever for gear transmissions is moved. Control of the transmission will therefore be readily understood and easily accomplished by operators accustomed to the present types of conventional gear transmissions.

Figure 16:
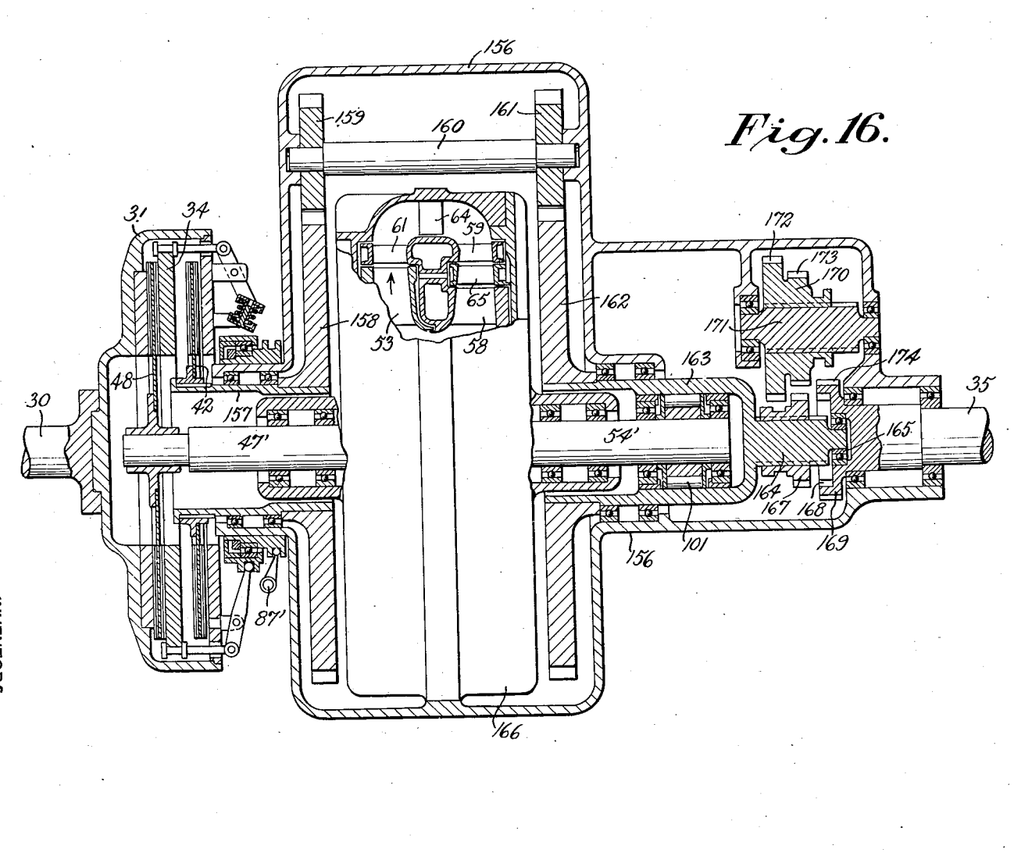
Fig. 16 is a more or less diagrammatic longitudinal section, partly in elevation, of another form of transmission; and, Fig. 17 is a diagram illustrating operating characteristics of transmissions of the character described.

In Fig. 16 there is illustrated in more or less diagrammatic fashion a different form of transmission embodying the invention. In the present embodiment the driving shaft 30 carries a clutch housing member 31 in which is slidably mounted the clutch plate 34 adapted to alternatively engage the driven clutch plates 48 and 42. Operating control of the clutch plate 34 is advantageously effected through mechanism similar to that already described in connection with Fig. 2 and actuated from an operating shaft indicated at 87'. An outer casing or housing 156 serves to rotatably support a sleeve 157 to which is fixed a gear 158. Clutch plate 42 is fixed to the forward end of sleeve 157. Gear 158 meshes with a gear 159 mounted on shaft 160 which is supported in the casing 156. A second gear 161 on shaft 160 meshes with a gear 162 fixed to the sleeve member 163 rotatably mounted in casing 156. A short shaft 164 projects rearwardly from sleeve 163 and the end of this shaft is rotatably mounted in a socket in the driven shaft 35 by means of bearing 165.

Secured within the outer casing 156 is the hydraulic transmission casing indicated generally at 166, which casing corresponds to the casing members 25 and 26 in Fig. 2. The primary driving member 47' of the hydraulic mechanism is rotatably mounted in casing 166 and is secured to the clutch plate 48. Rotation of this member effects rotation of the secondary or driven member 54' of the hydraulic mechanism in the manner already described.

The secondary member 54' is connected to the sleeve 163 through the medium of an overrunning clutch of the type shown in Fig. 4 and comprising roller detents 101.

Slidably mounted on the shaft 164 is the gear 167 which is adapted to mesh with internal teeth 168 on the extension 169 of shaft 35. When gear 167 is moved so that its teeth are in meshing engagement with teeth 168 a direct drive connection is established between shafts 164 and 35. A speed reducing gear cluster 170 is slidably mounted on shaft 171 for providing a geared speed reduction between shafts 164 and 35. This cluster comprises gears 172 and 173 and when moved to the right from the position shown in the figure, gear 172 meshes with gear 167 and gear 173 meshes with a set of external teeth 174 on the extension 169, these gears thus affording the desired speed reduction between the two shafts which they connect. A reversing idler gear which may be of the character disclosed in the form of transmission shown in Fig. 2 and associated figures is also provided, this gear not appearing in the present figure.

In the present embodiment it will be evident that with clutch plate 48 engaged as shown in the drawing, drive will be effected through the hydraulic speed reducing mechanism and the overrunning clutch to shaft 164, from which shaft drive may be transmitted directly or at reduced speed to shaft 35.

By shifting the clutch plate 34 so as to engage the driven clutch plate 42, drive is transmitted through gears 158, 159, 161 and 162 to shaft 164, from which drive may be transmitted to the shaft 35 either directly or at reduced speed through the gear mechanism comprising the gear cluster 170. As in the previously described form of transmission, the hydraulic speed reducing mechanism is automatically released, both as to the primary and secondary members when mechanical connection is effected between the driving shaft 30 and the driven shaft 35, the overrunning clutch comprising the detents 101 acting to prevent drag of the secondary member of the hydraulic mechanism when the mechanical drive connection is established.

Figure 17:
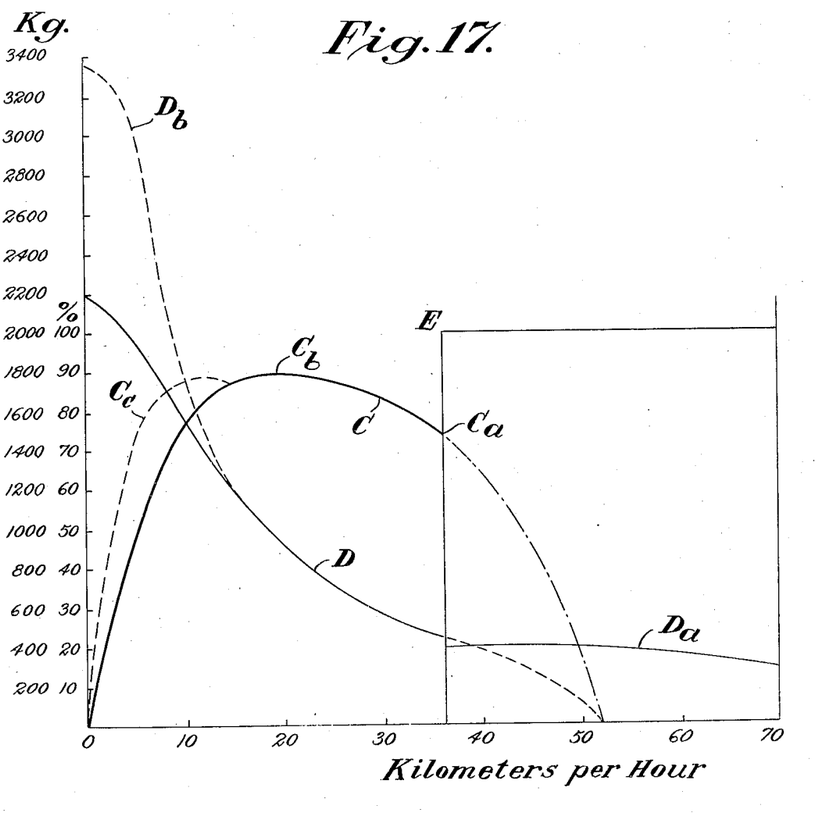

The curves given in Fig. 17 serve to illustrate the improvements in operating characteristic which may be obtained with transmissions embodying the present invention as compared with transmissions capable of operating only through the medium of hydraulic variable speed mechanism.

In the coordinate system in this figure, abscissæ represent the speed of the vehicle in kilometers per hour, while ordinates represent the tractive force in kilograms as well as the efficiency of the hydraulic gear.

Curve C designates the efficiency of the hydraulic gear mechanism at various speeds, and curve D designates the tractive force obtained with the use of said mechanism. When the motor vehicle is started, the efficiency of the hydraulic mechanism is very low, as shown by curve C, but increases to a certain value with an increased speed of the vehicle. Curve C further shows that the efficiency of the hydraulic mechanism is the highest at a speed of the vehicle between 10 and 30 kilometers per hour, and that the efficiency is considerably lowered when the speed exceeds 30 kilometers per hour. With an increased speed, the tractive power is also reduced, as shown by curve D, so that with the embodiment shown the same is almost zero at a speed of somewhat over 50 kilometers per hour. As will be found, the efficiency of the hydraulic mechanism is comparatively low at speeds above 36 kilometers per hour and corresponds to the dash-dot portion of curve C to the right of the point $C_a$. Thus, if only the hydraulic mechanism were used in motor vehicles, the vehicle could hardly be propelled at speeds higher than 40 or 45 kilometers per hour. If a motor vehicle should nevertheless be built with hydraulic mechanism only, this mechanism must be constructed so that the apex $C_b$ of the efficiency curve is situated at greater speeds of the motor vehicle. Under such circumstances, however, the tractive power will be very small in the starting of the motor vehicle, whereby the use of the vehicle will be limited. In order to increase the starting capacity of the vehicle, the hydraulic mechanism is used only at lowered speeds, according to the invention, preferably at speeds falling below half of the maximum speed for which the vehicle is constructed, whereas the same is disconnected at higher speeds, so that the power from the driving shaft is transmitted to the driven shaft without the agency of the hydraulic mechanism. This shifting of the gear should take place at the point of the efficiency curve corresponding to the point $C_a$. When shifting is effected for direct transmission, the efficiency will thus rise to the point E, that is to say to 100%, and will then be of the same magnitude for all speeds above that at which the shifting takes place.

Obviously, the tractive power will then increase and correspond to the curve $D_a$ in the drawings.

With certain motor vehicles and with a certain use of the same, such as an omnibus which is to be started under extremely severe conditions, for instance in a steep gradient, a greater tractive power is necessary at the starting moment.

According to the invention, this greater tractive power is obtained by coupling the mechanical change speed gear described in connection with Fig. 16 to the driven shaft when the vehicle is started. The efficiency of the combined gear then corresponds to the dash line curve $C_c$ in Fig. 17, the tractive power being then increased to a value corresponding to the curve $D_b$. Generally, the position of the apex $C_b$ may be selected relatively to the speed of the vehicle in such a manner that on most occasions the vehicle will be propelled with the best efficiency of the hydraulic mechanism. However, as under these conditions losses will also ensue, and as the efficiency of the hydraulic mechanism will be low at other speeds, such mechanism is not entirely suitable for vehicles with greatly varying speeds. According to the invention, the apex $C_b$ is placed at lower speeds of the vehicle, while the driving shaft and the driven shaft are connected directly to each other at higher speeds. In motor trucks or omnibuses, for example, which are to be started in places with a steep gradient, a further mechanical auxiliary gear is used to increase the tractive power at the starting moment.

The displacement of the apex of the efficiency curve of the hydraulic mechanism may be effected in various ways, for instance by altering the construction of details of the mechanism, such as the blades thereof, or by altering the ratio of gear in a differential gear or the like cooperating with the hydraulic mechanism.

Arrangements according to the invention may therefore be used in any motor driven vehicles, whether these be propelled on streets, on highways or on rails.

Further embodiments of the invention are conceivable, and thus the invention is not limited to the combinations disclosed by way of example.

What is claimed is:

1. A variable speed power transmission comprising a driving shaft, a driven shaft, means forming mechanical power transmitting connection between said shafts to provide drive therebetween, hydraulic variable speed power transmitting mechanism for transmitting power from the driving shaft to the driven shaft to provide asynchronous drive between said shafts, means for selectively engaging said first named means to transmit power from the driving shaft to the driven shaft, means for selectively transmitting power through the hydraulic mechanism, and means for automatically disconnecting the entire hydraulic mechanism from operative relationship with the remaining parts of the transmission upon transmission of power through said first named means.

2. A variable speed power transmission comprising a driving shaft, a driven shaft, means forming a mechanical power transmitting connection between said shafts to provide synchronous drive therebetween, hydraulic variable speed power transmitting mechanism for transmitting power from the driving shaft to the driven shaft to provide asynchronous drive between said shafts, said mechanism including a member for delivering power to the driven shaft, means for selectively transmitting power from said driving shaft to said driven shaft alternatively through said first named means and said hydraulic variable speed mechanism, and means for automatically preventing transmission of power from the driven shaft to said member when power is transmitted to said driven shaft through said first named means.

3. A variable speed power transmission comprising a driving shaft, a driven shaft, a clutch for transmitting power from the driving shaft directly to the driven shaft, hydraulic variable speed power transmitting mechanism comprising a primary or driving member and a secondary or driven member, a clutch for transmitting power from the driving shaft to said primary member, means for selectively engaging one or the other of said clutches, and means operating automatically to connect said secondary member and said driven shaft in driving relation when power is transmitted through the second mentioned clutch and to disconnect said driven shaft from driving relation with said secondary member when power is transmitted through the first mentioned clutch.

4. A variable speed power transmission comprising a driving shaft, a driven shaft, hydraulic variable speed power transmitting mechanism comprising a primary or driving member and a secondary or driven member, an overrunning clutch arranged to transmit power from said secondary member to said driven shaft, a clutch for transmitting power from the driving shaft directly to the driven shaft, a clutch for transmitting power from the driving shaft to said primary member, and means for selectively engaging one or the other of the two last mentioned clutches.

5. A variable speed power transmission comprising a driving shaft, a driven shaft in axial alignment with the driving shaft, a clutch for transmitting power directly from the driving shaft to the driven shaft, hydraulic variable speed power transmitting mechanism comprising an annular primary or driving member rotatably mounted and co-axial with the axis of said shafts and an annular secondary or driven member rotatably mounted and co-axial with the axis of said shafts, a clutch for transmitting power from the driving shaft to said primary member, means for selectively causing engagement of one or the other of said clutches, and means for transmitting power from said secondary member to said driven shaft, said last mentioned means releasing automatically to prevent transmission of power from the driven shaft to said secondary member.

6. A variable speed power transmission comprising a driving shaft, a driven shaft in axial alignment with the driving shaft, a clutch for transmitting power directly from the driving shaft to the driven shaft, hydraulic variable speed power transmitting mechanism comprising an annular primary or driving member rotatably mounted and co-axial with the axis of said shafts and an annular secondary or driven member rotatably mounted and coaxial with the axis of said shafts, said driven shaft comprising a part extending through said members to said clutch, a clutch for transmitting power from the driving shaft to said primary member, means for selectively causing engagement of one or the other of said clutches, and an overrunning clutch for transmitting power from said secondary member to said driven shaft.

7. A variable speed power transmission comprising a driving shaft, a driven shaft in axial alignment with the driving shaft, a clutch for transmitting power directly from the driving shaft to the driven shaft, hydraulic variable speed power transmitting mechanism comprising an annular primary or driving member rotatably mounted and co-axial with the axis of said shafts and an annular secondary or driven member rotatably mounted and co-axial with the axis of said shafts, said driven shaft comprising a part extending through said members to said clutch, a clutch for transmitting power from the driving shaft to said primary member, common actuating means for selectively causing engagement of one or the other of said clutches, and an overrunning clutch for transmitting power from said secondary member to said driven shaft.

8. A variable speed power transmission comprising a driving shaft, a driven shaft in axial alignment with the driving shaft, hydraulic variable speed power transmitting mechanism comprising an annular primary or driving member rotatably mounted around said driven shaft and an annular secondary or driven member rotatably mounted around said driven shaft, an overrunning clutch for transmitting power from said secondary member to said driven shaft and clutch mechanism for selectively transmitting power directly from the driving shaft to the driven shaft and to the primary member in alternation.

9. A variable speed power transmission comprising a driving shaft, a driven shaft, a casing, hydraulic variable speed power transmitting mechanism comprising a primary or driving member rotatably mounted in said casing and a secondary or driven member rotatably mounted in said casing, an overrunning clutch for transmitting power from said secondary member to said driven shaft and clutch mechanism for selectively transmitting power directly from the driving shaft either to the driven shaft or to the primary member, said clutch mechanism comprising a first clutch member connected to said driven shaft, a second clutch member connected to said primary member, and a clutch driving member connected to the driving shaft and shiftable to alternatively engage said first clutch member and said second clutch member.

10. A variable speed power transmission comprising a driving shaft, a driven shaft in axial alignment with the driving shaft, hydraulic variable speed power transmitting mechanism comprising an annular primary or driving member rotatably mounted around said driven shaft and an annular secondary or driven member rotatably mounted around said driven shaft, an overrunning clutch for transmitting power from said secondary member to said driven shaft and clutch mechanism for selectively transmitting power directly from the driving shaft either to the driven shaft or to the primary member, said clutch mechanism comprising a first clutch member connected to said driven shaft, a second clutch member connected to said primary member, and a clutch driving member connected to the driving shaft and shiftable to alternatively engage said first clutch member and said second clutch member.

11. In a variable speed power transmission, in combination, a driving shaft, a driven shaft, hydraulic variable speed power transmitting mechanism for transmitting power from the driving shaft to the driven shaft, a first friction clutch for directly connecting the driving shaft with the driven shaft, a second friction clutch for connecting the driving shaft with said hydraulic variable speed mechanism and common operating mechanism for selectively causing engagement of one or the other of said clutches.

12. A variable speed power transmission comprising a driving shaft, a driven shaft, hydraulic variable speed power transmitting mechanism for transmitting power from the driving shaft to the driven shaft, a first clutch for directly connecting the driving shaft with the driven shaft, a second clutch for connecting the driving shaft with said hydraulic variable speed mechanism and common operating means for selectively causing engagement of one or the other of said clutches, said means comprising spring actuated toggle mechanism for maintaining one or the other of the clutches in engagement.

13. A variable speed power transmission comprising a driving shaft, a driven shaft, hydraulic variable speed power transmitting mechanism for transmitting power from the driving shaft to the driven shaft, a first clutch for directly connecting the driving shaft with the driven shaft, a second clutch for connecting the driving shaft with said hydraulic variable speed mechanism, common operating means for causing alternative engagement of one or the other of said clutches, said means comprising spring actuated toggle mechanism tending to maintain one or the other of the clutches in engagement, a first pedal for moving said means in one direction to cause engagement of one clutch upon depression of said first pedal, and a second pedal for moving said means in the opposite direction to cause engagement of the other clutch upon depression of said second pedal.

14. A variable speed power transmission comprising a driving shaft, a driven shaft, hydraulic variable speed power transmitting mechanism for transmitting power from the driving shaft to the driven shaft, a first clutch for directly connecting the driving shaft with the driven shaft, a second clutch for connecting the driving shaft with said hydraulic variable speed mechanism and common operating means for causing alternative engagement of one or the other of said clutches, said means comprising spring actuated toggle mechanism tending to maintain one or the other of the clutches in engagement, a first pedal for moving said means in one direction to cause engagement of one clutch upon depression of said first pedal, and a second pedal for moving said means in the opposite direction to cause engagement of the other clutch upon depression of said second pedal, said pedals being interconnected so that depression of one pedal causes the other pedal to rise.

15. A variable speed power transmission comprising a driving shaft, a driven shaft, hydraulic variable speed power transmitting mechanism for transmitting power from the driving shaft to the driven shaft, a first clutch for directly connecting the driving shaft with the driven shaft, a second clutch for connecting the driving shaft with said hydraulic variable speed mechanism and common operating means for causing alternative engagement of one or the other of said clutches, said means comprising spring actuated toggle mechanism tending to maintain one or the other of the clutches in engagement, a first pedal for moving said means in one direction to cause engagement of one clutch upon depression of said first pedal, and a second pedal for moving said means in the opposite direction to cause engagement of the other clutch upon depression of said second pedal, and means interconnecting said pedals so that depression of one pedal causes the other pedal to rise, said pedals being located laterally closely adjacent to each other and said last mentioned means being arranged to cause the pedals to pass each other in substantially the mid position of their paths of travel.

16. A variable speed power transmission comprising a driving shaft, a driven shaft, hydraulic variable speed power transmitting mechanism for transmitting power from the driving shaft to the driven shaft, a first clutch for connecting the driving shaft with said driven shaft, a second clutch for connecting the driving shaft with said variable speed power transmitting mechanism, a releasable coupling in the path of power transmission from the variable speed hydraulic mechanism to the driven shaft, reversing mechanism for transmitting power from the hydraulic variable speed mechanism to the driven shaft, actuating mechanism for selectively causing engagement of one or the other of said clutches, actuating mechanism for releasing said coupling and for causing engagement of said reversing mechanism, a single control member and mechanism operatively connecting each of said actuating mechanisms with said single control member.

17. A variable speed power transmission comprising a driving shaft, a driven shaft, hydraulic variable speed power transmitting mechanism for transmitting power from the driving shaft to the driven shaft, a first clutch for connecting the driving shaft with said driven shaft, a second clutch for connecting the driving shaft with said variable speed power transmitting mechanism, a releasable coupling in the path of power transmission from the variable speed hydraulic mechanism to the driven shaft, reversing mechanism for transmitting power from the hydraulic variable speed mechanism to the driven shaft, actuating mechanism for selectively causing engagement of one or the other of said clutches, actuating mechanism for releasing said coupling and for causing engagement of said reversing mechanism, a single control lever and mechanism operatively connecting each of said actuating mechanisms with said single control lever, said last named mechanism comprising a shaft axially movable to operate one of said actuating mechanisms and turnable to operate the other of said actuating mechanisms.

18. A variable speed power transmission comprising a driving shaft, a driven shaft, hydraulic variable speed power transmitting mechanism for transmitting power from the driving shaft to the driven shaft, a first clutch for mechanically connecting the driving shaft with said driven shaft, a second clutch for connecting the driving shaft with said variable speed power transmitting mechanism, an overrunning clutch in the path of power transmission between said variable speed mechanism and the driven shaft, a releasable coupling between the overrunning clutch and the driven shaft, reversing mechanism for transmitting power from the overrunning clutch to the driven shaft, actuating mechanism for selectively engaging one or the other of said clutches, actuating mechanism for releasing said coupling for causing engagement of said reversing mechanism, a single manually operable control lever and control mechanism operatively connecting each of said actuating mechanisms with said lever.

19. A variable speed power transmission comprising a driving shaft, a driven shaft, hydraulic variable speed power transmitting mechanism for transmitting power from the driving shaft to the driven shaft, a first clutch for mechanically connecting the driving shaft with said driven shaft, a second clutch for connecting the driving shaft with said variable speed power transmitting mechanism, an overrunning clutch in the path of power transmission between said variable speed mechanism and the driven shaft, a releasable coupling between the overrunning clutch and the driven shaft, reversing mechanism for transmitting power from the overrunning clutch to the driven shaft, actuating mechanism for selectively engaging one or the other of said clutches, actuating mechanism for releasing said coupling and for causing engagement of said reversing mechanism, a universally pivoted control lever and mechanism operatively connecting each of said actuating mechanisms with said lever, said control mechanism comprising parts arranged to cause pivoting of the lever in one plane to operate one of said actuating mechanisms and to cause pivoting of the lever in another plane to operate the other of said actuating mechanisms.

20. A variable speed power transmission comprising a driving shaft, a driven shaft, an intermediate member, hydraulic variable speed power transmitting mechanism, a releasable coupling for transmitting power from the driving shaft to the hydraulic mechanism, mechanical means including a releasable coupling for transmitting power from said driving shaft to said intermediate member, means for selectively engaging one or the other of said couplings, an overrunning clutch for transmitting power from the hydraulic mechanism to said intermediate member, and a releasable coupling between said intermediate member and the driven shaft.

21. A variable speed power transmission comprising a driving shaft, a driven shaft, an intermediate member, hydraulic variable speed power transmitting mechanism, a releasable coupling for transmitting power from the driving shaft to the hydraulic mechanism, mechanical means including a releasable coupling for transmitting power from said driving shaft to said intermediate member, means for selectively engaging one or the other of said couplings, an overrunning clutch for transmitting power from the hydraulic mechanism to said intermediate member, a releasable coupling between said intermediate member and the driven shaft and mechanical speed reducing gearing adapted to transmit power from the intermediate member to the driven shaft.

22. A variable speed power transmission comprising a driving shaft, a driven shaft, an intermediate member, hydraulic variable speed power transmitting mechanism, a releasable coupling for transmitting power from the driving shaft to the hydraulic mechanism, mechanical means including a releasable coupling for transmitting power from said driving shaft to said intermediate member, means for selectively engaging one or the other of said couplings, an overrunning clutch for transmitting power from the hydraulic mechanism to said intermediate member, a releasable coupling between said intermediate member and the driven shaft, and mechanical gearing comprising parts movable to one position to transmit power directly from the intermediate member to the driven shaft and to a second position to transmit power at reduced speed from the intermediate member to the driven shaft.

23. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable-speed power transmitting mechanism, a second releasable clutch for transmitting power from the driving shaft to said hydraulic variable-speed mechanism and an overrunning clutch and a releasable coupling in series in the path through which power is transmitted from the hydraulic mechanism to the driven shaft, reversing mechanism for transmitting power from said hydraulic variable-speed mechanism to said driven shaft, means for alternatively engaging either one or the other of said releasable clutches, means for engaging said reversing mechanism and means for releasing said coupling prior to engagement of said reversing mechanism.

24. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable-speed power transmitting mechanism, a second releasable clutch for transmitting power from the driving shaft to said hydraulic variable-speed mechanism, an overrunning clutch and a releasable coupling between the overrunning clutch and the driven shaft, reversing mechanism for transmitting power from said overrunning clutch to said driven shaft, means for engaging said reversing mechanism and means for releasing said coupling prior to engagement of said reversing mechanism.

25. A variable-speed power transmission comprising a driving shaft, a driven shaft, means comprising a releasable clutch for transmitting power mechanically from the driving shaft to the driven shaft, means for transmitting power from the driving shaft to the driven shaft, said last named means comprising hydraulic variable-speed power transmitting mechanism, a second releasable clutch for transmitting power from the driving shaft to said hydraulic variable-speed mechanism and an overrunning clutch and a releasable coupling in series in the path through which power is transmitted from the hydraulic mechanism to the driven shaft, reversing gears for transmitting power from said hydraulic variable-speed mechanism to said driven shaft, means for engaging said reversing gears, means for releasing said coupling prior to engagement of said reversing gears and manually operable control means for holding both of said clutches in released position to permit engagement of said reversing gears.

26. A variable-speed power transmission comprising a non-rotatably mounted casing providing a chamber for operating fluid, a driving shaft, a driven shaft, means forming a releasable mechanical power transmitting connection between said shafts to provide drive therebetween, hydraulic variable speed power transmitting mechanism for transmitting power from the driving shaft to the driven shaft to provide asynchronous drive between said shafts, said mechanism comprising a primary member rotatably mounted in said casing and having an impeller portion in said chamber and a secondary member rotatably mounted in said casing and having an impelled portion in said chamber arranged to receive operating fluid discharged from said impeller portion, means forming a releasable connection between said driving shaft and said primary member, means for selectively transmitting power from said driving shaft alternatively through either one or the other of said connections and means providing a driving connection between said secondary member and said driven shaft, said last-mentioned means being releasable to disconnect said secondary member from said driven shaft when power is transmitted through said first-mentioned means.

27. A variable-speed power transmission comprising a non-rotatably mounted casing providing a chamber for operating fluid, a driving shaft, a driven shaft, mechanical means forming a releasable power transmitting connection between said shafts to provide drive therebetween, hydraulic variable speed power transmitting mechanism for transmitting power from the driving shaft to the driven shaft to provide asynchronous drive between said shafts, said mechanism comprising a primary member rotatably mounted in said casing and having an impeller portion in said chamber and a secondary member rotatably mounted in said casing and having an impelled portion in said chamber arranged to receive operating fluid discharged from said impeller portion, means for selectively transmitting power from said driving shaft alternatively through either said mechanical means or the hydraulic mechanism, an overrunning clutch providing a driving connection between said secondary member and said driven shaft, said overrunning clutch permitting said secondary member to remain stationary when power is transmitted to the driven shaft through said mechanical means.

28. A variable-speed power transmission comprising a non-rotatably mounted casing providing a chamber for operating fluid, a driving shaft, a driven shaft, means forming a releasable mechanical power transmitting connection between said shafts to provide drive therebetween, hydraulic variable speed power transmitting mechanism for transmitting power from the driving shaft to the driven shaft to provide asynchronous drive between said shafts, said mechanism comprising a primary member rotatably mounted in said casing and having an impeller portion in said chamber and a secondary member rotatably mounted in said casing and having an impelled portion situated in said chamber arranged to receive operating fluid discharged from said impeller portion, means forming a releasable connection between said driving shaft and said primary member, means for selectively transmitting power from said driving shaft alternatively through either one or the other of said connections and an overrunning clutch providing a driving connection between said secondary member and said driven shaft, said last-mentioned means and said overrunning clutch permitting said members to remain stationary when power is transmitted to the driven shaft through said first-named means.

29. A variable-speed power transmission comprising a non-rotatably mounted casing providing a chamber for operating fluid, a driving shaft, a driven shaft, means comprising a first friction clutch for providing a releasable mechanical power transmitting connection between said shafts to provide drive therebetween, hydraulic variable speed power transmitting mechanism for transmitting power from the driving shaft to the driven shaft to provide a synchronous drive between said shafts, said mechanism comprising a primary member rotatably mounted in said casing and having an impeller portion in said chamber and a secondary member rotatably mounted in said casing and having an impelled portion in said chamber arranged to receive operating fluid discharged from said impeller portion, means comprising a second friction clutch for providing a releasable connection between said driving shaft and said primary member, means for selectively transmitting power from said driving shaft alternatively through either one or the other of said clutches and means comprising a third releasable clutch for transmitting power from said secondary member to said driven shaft, said first and said third clutches being concurrently releasable to permit said members to remain stationary when power is transmitted to the driven shaft through said first-mentioned clutch.

30. A variable-speed power transmission comprising a non-rotatably mounted casing, a driving shaft, a driven shaft, hydraulic variable speed power transmitting mechanism comprising a primary member and a secondary member, said members being rotatably mounted in said casing, means comprising a releasable coupling for transmitting power from the driving shaft to said primary member, means comprising mechanical speed reducing gearing adapted to transmit power from said secondary member to the driven shaft, means comprising a second releasable coupling for transmitting power from said driving shaft to said driven shaft and actuating means for selectively and alternatively engaging one or the other of said couplings.

31. A variable-speed power transmission comprising a non-rotatably mounted casing, a driving shaft, a driven shaft, hydraulic variable speed power transmitting mechanism comprising a primary member and a secondary member, said members being rotatably mounted in said casing, means comprising a releasable coupling for transmitting power from the driving shaft to said primary member, means comprising an overrunning clutch and mechanical speed reducing gearing for transmitting power from said secondary member to said driven shaft, means comprising a second releasable coupling for transmitting power from said driving shaft to said driven shaft and actuating means for selectively and alternatively engaging one or the other of said couplings.

32. In a variable speed power transmission, a non-rotatably mounted casing, a driving shaft, a driven shaft, an intermediate power transmitting member rotatably mounted in said casing, mechanical means and means including hydraulic variable-speed power transmitting mechanism for alternatively transmitting power to said intermediate member, and mechanical means for selectively transmitting power from said intermediate member to said driven shaft directly or at reduced speed.

33. In a variable-speed power transmission, a non-rotatably mounted casing, a driving shaft, a driven shaft, an intermediate power transmitting member rotatably mounted in said casing, mechanical means and means including hydraulic variable-speed power transmitting mechanism for alternatively transmitting power to said intermediate member, said hydraulic mechanism, comprising a driven member rotatably mounted in said casing and relatively rotatable with respect to said intermediate member and mechanical means for selectively transmitting power from said intermediate member to said driven shaft directly or at reduced speed, the second-mentioned means comprising a clutch for automatically disconnecting said mechanism from said intermediate member when power is transmitted through the first-mentioned means.

34. A variable-speed power transmission comprising a driving shaft, a driven shaft, a first means for transmitting power mechanically from the driving shaft to the driven shaft, a second means for transmitting power from the driving shaft to the driven shaft comprising hydraulic variable-speed power transmitting mechanism and a releasable coupling between said mechanism and the driven shaft, reversing mechanism for transmitting power from the hydraulic variable-speed mechanism to the driven shaft, actuating means for selectively causing power to be transmitted through either said first means or said second means, actuating means for controlling said reversing means and said coupling, a single control member and means operatively connecting each of said actuating means with said member.

35. A variable-speed power transmission comprising a driving shaft, a driven shaft, a first means for transmitting power mechanically from the driving shaft to the driven shaft, a second means for transmitting power from the driving shaft to the driven shaft comprising hydraulic variable-speed power transmitting mechanism and a releasable coupling between said mechanism and the driven shaft, reversing mechanism for transmitting power from the hydraulic variable-speed mechanism to the driven shaft, actuating means selectively causing power to be transmitted through either said first means or said second means, actuating means for controlling said reversing means and said coupling, a universally pivoted control lever and mechanism operatively connecting each of said actuating means with said lever, said last-mentioned mechanism comprising parts arranged to cause pivoting of the lever in one plane to operate one of said actuating means and to cause pivoting of the lever in another plane to operate the other of said actuating means.

In testimony whereof we have affixed our signatures.

ALF LYSHOLM.
FRED HORNEY.
GÖSTA WAHLSTEN.